(No Model.)

G. C. BURCH.
VEHICLE GEAR.

No. 356,821. Patented Feb. 1, 1887.

Witnesses
Tyler P. Howard
Lucy A. Kingsbury

Inventor
George C. Burch,
By his Attorney
Frank H. Allen

UNITED STATES PATENT OFFICE.

GEORGE C. BURCH, OF GROTON, CONNECTICUT, ASSIGNOR OF ONE-HALF TO ROSWELL S. EDGCOMB, OF SAME PLACE.

VEHICLE-GEAR.

SPECIFICATION forming part of Letters Patent No. 356,821, dated February 1, 1887.

Application filed October 14, 1886. Serial No. 216,280½. (No model.)

*To all whom it may concern:*

Be it known that I, GEORGE C. BURCH, a resident of the town of Groton, in the county of New London and State of Connecticut, have invented certain new and useful Improvements in Vehicle-Gears, said improvements being described in detail in the following specification, and illustrated in the accompanying drawings.

My invention is in that class of gears in which so-called "cranked axles" are used; and it consists of certain improvements in the means employed to secure the spring to said axles. It also relates to the method of attaching the thills and sand-boxes.

One object of my invention is to provide a spring-attaching device which shall allow free endwise play of the spring when depressed, and which requires no special lugs or projections forged integral with the axle, my device being formed preferably of malleable iron or cast-steel and adapted to be attached to the axle by clips of ordinary construction.

Figure 1:
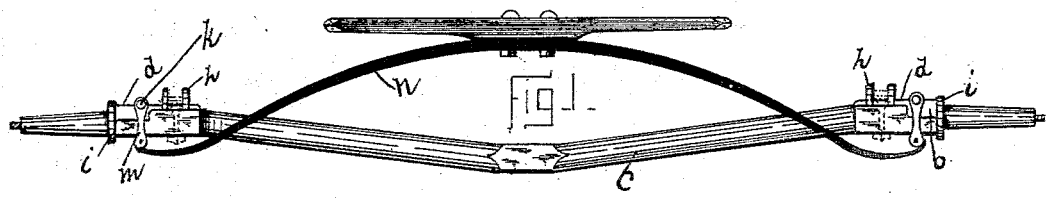
Figure 2:
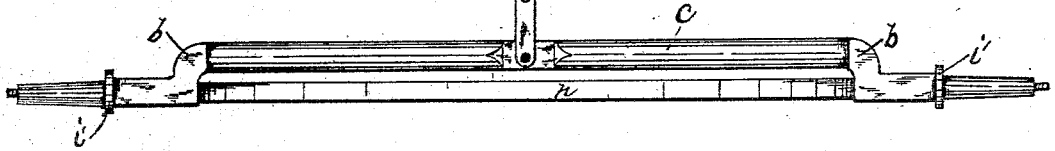
Figure 3:
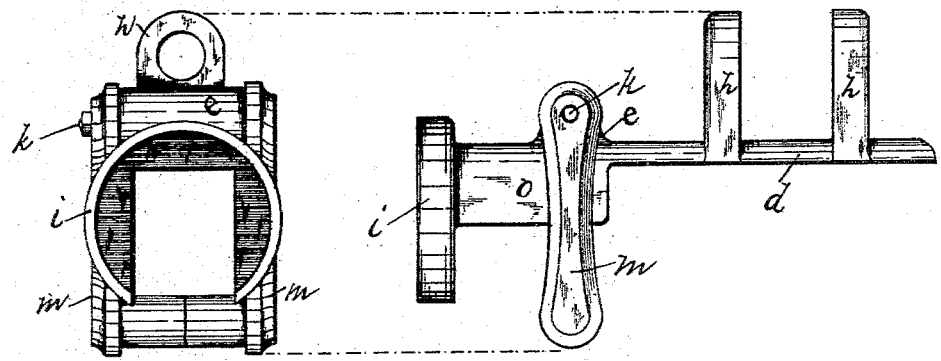

Referring to the drawings, Figure 1 is a rear elevation of an axle having its spring attached by my newly-invented device, and Fig. 2 is a top view of the axle with said attaching device removed. In Fig. 3 I have shown a side elevation and an outer end view of the said spring-attaching device considerably enlarged.

The reference-letter $a$ indicates an axle cranked sidewise, as at $b$, and also depressed in a plane at right angles to crank $b$, (see $c$, Fig. 1.)

$d$ indicates a plate of about the width of the straight portion of the axle which it is to engage, and having formed integral with it a transverse rib, $e$, transverse lugs $h$, projecting upward to form a thill-coupling, and a sand-box, $i$. The rib $e$ is drilled to receive a bolt, $k$, to each end of which is hung a link, $m$, provided to receive and support one end of spring $n$. Said spring extends upward past the cranked portion of the axle, as shown in the drawings, being substantially the shape of the upper half of an ordinary elliptic spring.

With the spring secured as described, I am able to hang the body much lower than with a straight axle and elliptic spring.) The plate $d$ has integral angular extensions $o$ on its sides, which straddle the square portion of the axle and prevent lateral displacement, and said plate is firmly clamped to the axle by a single clip. (Indicated by dotted lines in Fig. 1.) The sand-box $i$ is cupped to slip over the axle-collar $i'$, and thus prevents endwise movement of the plate.

It will be obvious to a mechanic that the thill-coupling lugs $h$ could be dispensed with and a very satisfactory result attained; but I prefer to use the complete device, substantially as described, as it reduces materially the cost of a vehicle and provides a strong and simple means for accomplishing the three desired results—*i. e.*, an adjustable spring attachment, a thill-coupling, and a sand-box.

Having thus described my invention, I claim—

1. In combination with a semi-elliptic spring and a laterally-cranked axle of the form referred to, a plate adapted to rest on the straight portion of the axle adjacent to the arm, having pivotally secured thereto spring-supporting links, as described, and having formed as an integral part of said plate a sand-box adapted to slip over the axle-collar, and a clip for clamping together the plate and axle, in the manner set forth.

2. In combination with a semi-elliptic spring and a laterally-cranked axle of the form referred to, plate $d$, having pivotally secured thereto spring-supporting links, as described, and having both the integral thill-coupling lugs $h$ and sand-box $i$, and a clip for clamping together said plate and axle, substantially as set forth.

GEORGE C. BURCH.

Witnesses:
GEORGE COLFAX,
EDWD. T. BROWN.